(12) United States Patent
Davidson et al.

(10) Patent No.: US 7,089,956 B1
(45) Date of Patent: Aug. 15, 2006

(54) PORTABLE GAS DELIVERY DEVICE WITH IMPACT PROTECTION

(76) Inventors: Gilbert Davidson, 14099 Buckhorn Dr., Carmel, IN (US) 46032; Brian R. Davidson, 14060 Brookstone Dr., Carmel, IN (US) 46032; Goldshtrakh I. Lev, 6630 Lakenoll Dr., Indianapolis, IN (US) 46220

( * ) Notice: Subject to any disclaimer, the term of this patent is extended or adjusted under 35 U.S.C. 154(b) by 428 days.

(21) Appl. No.: 10/712,141

(22) Filed: Nov. 14, 2003

(51) Int. Cl.
  *F16L 35/00* (2006.01)
(52) U.S. Cl. ................................ 137/382; 137/377
(58) Field of Classification Search .............. 137/382, 137/377, 613; 220/581
  See application file for complete search history.

(56) References Cited

U.S. PATENT DOCUMENTS

| | | | | |
|---|---|---|---|---|
| 3,964,508 A | * | 6/1976 | Miller | 137/377 |
| 4,389,890 A | * | 6/1983 | Bolick et al. | 73/431 |
| 4,420,013 A | * | 12/1983 | DiBlasio | 137/382 |
| D273,510 S | * | 4/1984 | Mayor | D23/206 |
| 4,521,676 A | * | 6/1985 | Poulsen | 235/375 |
| 5,261,559 A | * | 11/1993 | Salvucci, Sr. | 220/727 |
| 5,975,121 A | * | 11/1999 | Arzenton et al. | 137/377 |
| 6,026,854 A | | 2/2000 | Davidson | |
| 6,082,396 A | | 7/2000 | Davidson | |
| D439,956 S | * | 4/2001 | Nilsson | D23/260 |
| 6,286,543 B1 | | 9/2001 | Davidson | |
| 6,311,722 B1 | * | 11/2001 | Gounot et al. | 137/382 |
| 6,314,986 B1 | * | 11/2001 | Zheng et al. | 137/240 |
| 6,328,280 B1 | | 12/2001 | Davidson | |
| 6,415,946 B1 | * | 7/2002 | Carlo et al. | 220/724 |
| 2004/0107966 A1 | * | 6/2004 | Joachimsthaler et al. | 128/204.26 |
| 2004/0108429 A1 | * | 6/2004 | Field et al. | 248/311.2 |

* cited by examiner

*Primary Examiner*—Eric Keasel
*Assistant Examiner*—Craig Schneider
(74) *Attorney, Agent, or Firm*—Kyle S. Brant

(57) ABSTRACT

A portable pressurized gas delivery system with impact protection includes a pressure regulator device comprised of a shut-off valve/refill portion, a pressure regulation portion and a flow control portion. The pressure regulator device is attached via a mating machine threaded portion to a high pressure gas vessel or tank. An adapter or flange washer is situated between the regulator device and tank. A u-shaped handle is attached to the flange washer and extends along side and beyond the height of the gas pressure regulator. A circular ring is transversely attached to the u-shaped handle and situated to surround the regulator device thereby providing impact protection from all directions for the gas pressure regulator device. The pressure regulator device and flange washer include mechanical alignment mechanisms so that angular alignment of the devices is established.

18 Claims, 6 Drawing Sheets

PORTABLE GAS DELIVERY DEVICE WITH IMPACT PROTECTION

FIELD OF THE INVENTION

This invention relates to gas flow control devices and, more particularly, to pressure regulated gas delivery devices for use with portable gas tanks and protecting such devices from damage due to rough handling thereof.

BACKGROUND OF THE INVENTION

Regulated gas flow control and pressure regulation devices are attached to portable medical gas or oxygen cylinders and used by those requiring medical gas delivery, most commonly, in response to a Doctor's prescription for oxygen. Such gas or oxygen delivery devices are used by individuals in all walks of life at work and during recreational times. The gas delivery devices are often times subject to fairly rough handling including tip-over events and severe impacts with solid objects during use, handling, transport and storage. The response from the medical gas regulator industry has been to produce gas regulator and flow control devices that are fairly sturdy in construction. However, the devices still fail on occasion due to excessive force impacts that occur during use as well as during transport and refilling operations.

A practical consideration in the design of portable gas delivery devices is size and weight. Excessive size or weight makes the device less attractive to end consumers, since oxygen delivery devices are typically carried by hand or pulled along in a small "pull cart" or dolly. Thus, it is desired that improved impact protection should be accomplished without significant additional weight added to the devices.

Portable gas delivery devices of the prior art also utilize a mechanical interface commonly referred to as a "post valve" for connecting a pressure regulator device to the tank. The post valve is attached to a pressurized tank via a threaded interface, and a regulator device or combination regulator/flow control device is then attached to the post valve. One example of such a post valve is shown in U.S. Pat. No. 6,148,841 to Davidson. An example of a regulator that connects to the post valve of the '841 patent is shown in U.S. Pat. No. 6,082,396 to Davidson. Refilling tanks incorporating such devices includes the initial step of opening the flow control section of the regulator and drawing a 25 inches of mercury vacuum on the system at the flow control outlet port of the regulator. Atmospheric air may potentially be drawn in through the relief valve of the regulator, and such a result is undesirable. Relief valves in pressure regulators typically activate at 1.5 times the normal working pressure of the regulator, or at about 75 PSI. Further, the seals of the flow control portion and seals in the post valve interface of the prior art regulator present potential leak points during system evacuation steps prior to refilling the tank or cylinder. Thus a design that eliminates the post valve to regulator interface and other potential leak points is desired.

What is needed is a gas delivery device with an impact protection mechanism that is adaptable to a wide variety of existing gas regulation device designs and provides improved impact protection to prevent physical damage to the pressure regulator/flow control devices. Further, the system should include design aspects to reduce difficulties encountered during refilling procedures and eliminate potential leak problems associated with prior art designs. In addition, the impact protection device should enhance the functionality of the entire gas delivery system without adding substantial weight or cost thereto.

SUMMARY OF THE INVENTION

A portable device for dispensing compressed gas according to one aspect of the present invention, comprises a sealed pressure vessel, the pressure vessel including a threaded aperture communicating with the interior of the pressure vessel, a flange washer having a gas aperture therethrough and wherein the flange washer is situated over the threaded aperture of the sealed pressure vessel so that the aperture of the flange washer is aligned with the threaded aperture, the flange washer further including a flange protrusion extending outward from the flange washer, a gas regulator including a body having a threaded protrusion adapted to mate with and engaging the threaded aperture of the sealed pressure vessel, a fluid channel within the body extending from within the body through the threaded protrusion and establishing fluid communication with the interior of the sealed pressure vessel, the gas regulator further including a pressure regulator in fluid communication with the fluid channel, the pressure regulator having an output orifice at which reduced pressure gas is available, the body further including a body protrusion that mechanically engages the flange protrusion, the body protrusion situated near the threaded protrusion, and a handle attached to the flange washer, the handle including a u-shaped portion attached to the flange washer at the free ends of the u-shaped portion, the first portion extending away from the pressure vessel and substantially surrounding the gas regulator, the handle including a second rod portion attached to the u-shaped rod portion and situated substantially transverse to the first portion, the second portion substantially surrounding the gas regulator.

One object of the present invention is to provide an improved portable pressurized gas delivery system.

Another object of the present invention is to provide a portable pressurized gas delivery system that includes impact protection for the more sensitive components of the assembly.

Still another object of the present invention is to provide an impact protection device for use with pressure regulation and flow control devices of existing designs.

Yet another object of the present invention is to eliminate potential leak areas associated with refilling operations and reduce labor content required for refilling tanks or cylinders.

These and other objects of the present invention will become more apparent from the following description of the preferred embodiment.

DESCRIPTION OF THE PREFERRED EMBODIMENT

Figure 1:
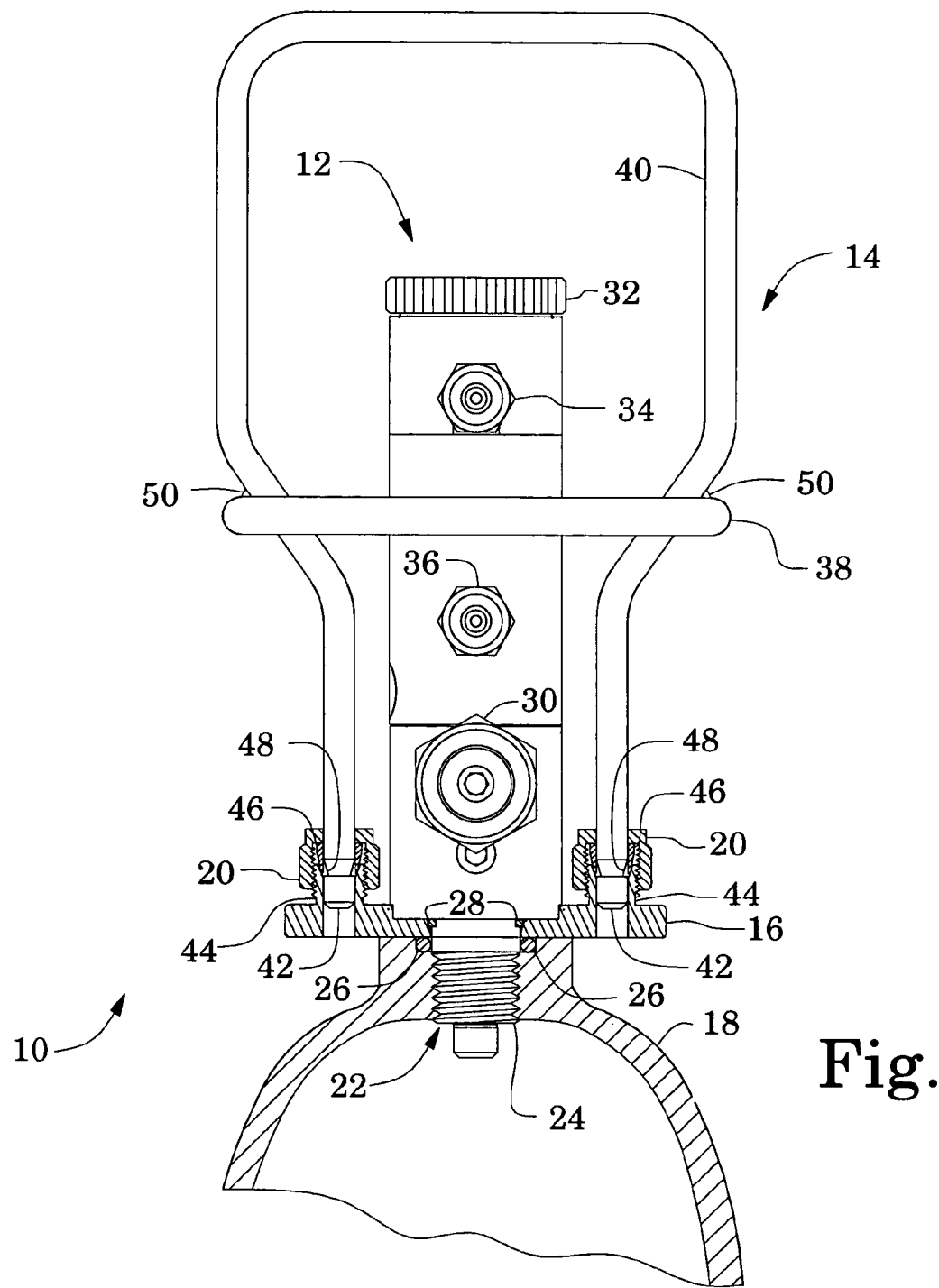
FIG. 1 is a front elevational view of the portable gas delivery device with impact protection.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a front elevational view of a portable gas delivery device with impact protection 10 according to the present invention is shown. Gas delivery device 10 is comprised of a pressure regulation and flow control device 12, a handle assembly 14, a flange washer 16, a high pressure tank 18, and nuts 20 which secure handle 14 to flange washer 16. Tank or cylinder 18 includes a threaded aperture 22 that receives a threaded portion 24 of pressure regulator 12. O-ring seals 26 and 28 provide a fluid seal between tank 18 and flange washer 16 and between flange washer 16 and pressure regulator and flow control device 12, respectively. Pressure regulator device 12 includes a fill port fitting 30 that is connected to a source of pressurized gas to refill tank 18 with a gas such as oxygen or other desired medical grade gas mixture. Fill port fitting 30 is a standard CGA (Compressed Gas Association) style fitting and incorporates an internal check valve shown in more detail in FIG. 1a. Knob 32 is rotationally positionable to control the flow rate of gas or oxygen at flow meter hose barb outlet fitting 34. Also shown is a CGA type regulated gas outlet fitting 36 that is optional with device 12 for delivery of pressure regulated gas to devices connected to fitting 36. More detail regarding device 12 follows in conjunction with the description of FIG. 1a.

Handle assembly 14 is comprised of two attached components, namely, rod 38 formed into a circular loop and u-shaped rod 40 that is formed as shown in a substantially u-shaped configuration with two free ends 42 that are received into apertures in flange washer 16. A threaded protrusion 44 extends outward from flange washer 16 and free ends 42 of rod 40 are received therein. Nuts 20 include a compression insert 46 that engages tapered ridge or notch 48 formed in rod 40 near free ends 42. Circular rod 38 and u-shaped rod 40 are attached to one another by a weldment at 50. Handle assembly 14 is intended to be easily removed in the event tank or cylinder refilling operations require removal thereof.

Figure 1A:
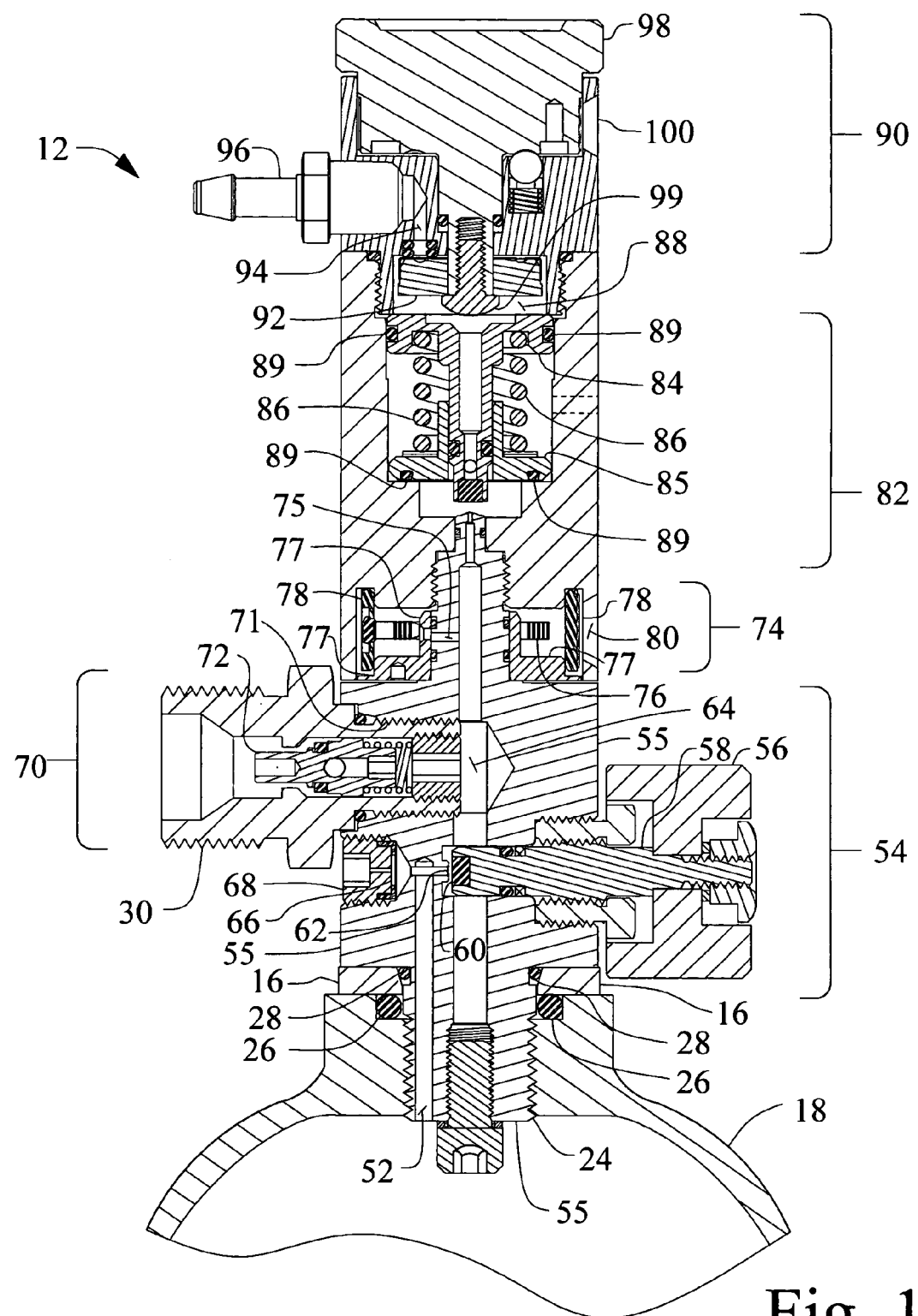
FIG. 1a is side elevational cross-sectional view of the device of FIG. 1.

Referring now to FIG. 1a, a side elevational cross-sectional view of device 10 of FIG. 1 is shown. In this view handle 14 is not shown, but rather, the internal details of pressure regulator and flow control device 12 are more particularly described. Device 12 is attached to tank 18 via threaded portion 24. O-ring seal 26 provides a fluid seal between tank 18 and flange washer 16. O-ring seal 28 provides a fluid seal between flange washer 16 and regulator device 12.

Regulator device 12 includes several functional component sections described as follows. A shut-off valve/refill portion 54 includes a body having a threaded portion 24 that engages internal threads of tank 18. Compressed gas within tank 18 enters regulator 12 through body 55 of portion 54 at fluid aperture or channel 52. Shut-off valve portion 54 includes a knurled knob 56 that rotationally engages threaded shaft 58. Shaft 58 includes a seal 60 disposed in a recess in the end of shaft 58. Seal 60 is urged into contact with orifice 62 upon clockwise rotation of shaft 58. Counterclockwise rotation of shaft 58 urges seal 60 away from orifice 62 so that pressurized gas in fluid channel 52 flows into fluid channel 64. A burst disk 66 is secured over an opening into fluid channel 52 by screw 68. Screw 68 includes an aperture therethrough that allows pressurized gas to escape or vent to atmosphere when burst disk 66 is ruptured due to excessive pressure within fluid channel 52.

A standard CGA type refill fitting assembly 70 is attached to refill body 55 via threaded portion 71. Assembly 70 includes an internal check-valve 72 that allow pressurized gas to flow into fluid channel 64 yet prevents gas from escaping channel 64 through fitting assembly 70. Check valves are well known in the art of pressurized gas devices and further discussion is not required. During refilling operations, a source of pressurized gas is attached to fitting assembly 70 and pressurized gas flows through fill port connection 30, into fluid channel 64, through connecting fluid channel 52 and into tank 18. Refilling of tank 18 requires that knob 56 be rotated thereby rotating shaft 58 and positioning seal 60 a small distance away from orifice 62 thereby allowing pressurized gas to flow through connector 70, into fluid channel 64, through orifice 62, into fluid channel 52 and subsequently into tank 18. Shut-off valve 54 must be in the open position for normal operation of the regulator device 12.

Pressure gauge portion 74, of device 12, includes a Bourdon tube 76 (well known in the art of pressure detection) that is mechanically attached to pressure indication ring 78. Bourdon tube 76 is in fluid communication with fluid channel 64 by way of aperture 75. Bourdon tube 76 is rotatable with respect to mounting 77 so that Bourdon tube 76 may be zero positioned with respect to body 55 prior to assembly of device 12. Ring 78 is rotated by Bourdon tube 76 within device 12 in response to pressure changes within Bourdon tube 76. Numerical pressure indication values are applied to the outer surface of ring 78 and are viewable through aperture 80. Thus, a pressure reading is provided and viewable by the user at aperture 80.

Pressure regulation portion 82 includes piston 84 that is in cooperating action with manifold 85 and spring 86 to regulate fluid pressure in fluid channel 64 and supplying the regulated pressure fluid or gas to fluid channel 88. O-ring fluid seals 89 are also shown and provide fluid seals where situated.

A flow control portion or flowmeter 90 includes a disk 92 having a plurality of variably sized apertures therein that enable various gas flow rates from fluid channel 88 into fluid channel 94. Pressurized gas in fluid channel 94 is delivered to barbed hose fitting 96. Knob 98 rotationally engages disk 92 to position disk 92 in a number of angular positions so that the plurality of variably sized apertures in disk 92 may be positioned adjacent and in alignment with fluid channel 94. Screw 99 mechanically attaches knob 98 to disk 92. Flow rate numbers are inscribed on the lateral surface of knob 98 and are viewable though aperture 100 so the user may readily select a desire gas flow rate that is provided at hose barb 96.

Considerable detail describing the components and operation of the pressure gauge portion 74, pressure regulator portion 82 and flowmeter portion 90 is set forth in U.S. Pat. No. 6,082,396. Gilbert Davidson, the inventor of the '396 invention, is a co-inventor in the present case. The description and details of operation of device 12 that are identical with or substantially similar to those corresponding components shown in U.S. Pat. No. 6,082,396 are wholly incorporated by reference herein.

Operationally speaking, pressurized gas in tank 18 enters into fluid channel 52, passes through shut-off valve orifice 62 and enters into fluid channel 64. Gauge portion 74 provides a pressure reading of the gas pressure within fluid channel 64, indicative of the remaining gas in tank 18. Gas in fluid channel 64 is reduced in pressure by pressure regulator portion 82 and pressure regulated gas is supplied to fluid channel 88. Regulated pressure gas in fluid channel 88 passes through one of a plurality of small apertures in disk 92. Flow metered and pressure regulated gas is supplied to fluid channel 94 at a flow rate determined by the size of the aperture in disk 92 positioned adjacent channel 94. Pressure and flow regulated gas is provided at hose barb fitting 96.

Materials used in the fabrication of device 12, such as brass and aluminum, are well known in the art of pressure regulation devices.

Figure 2:
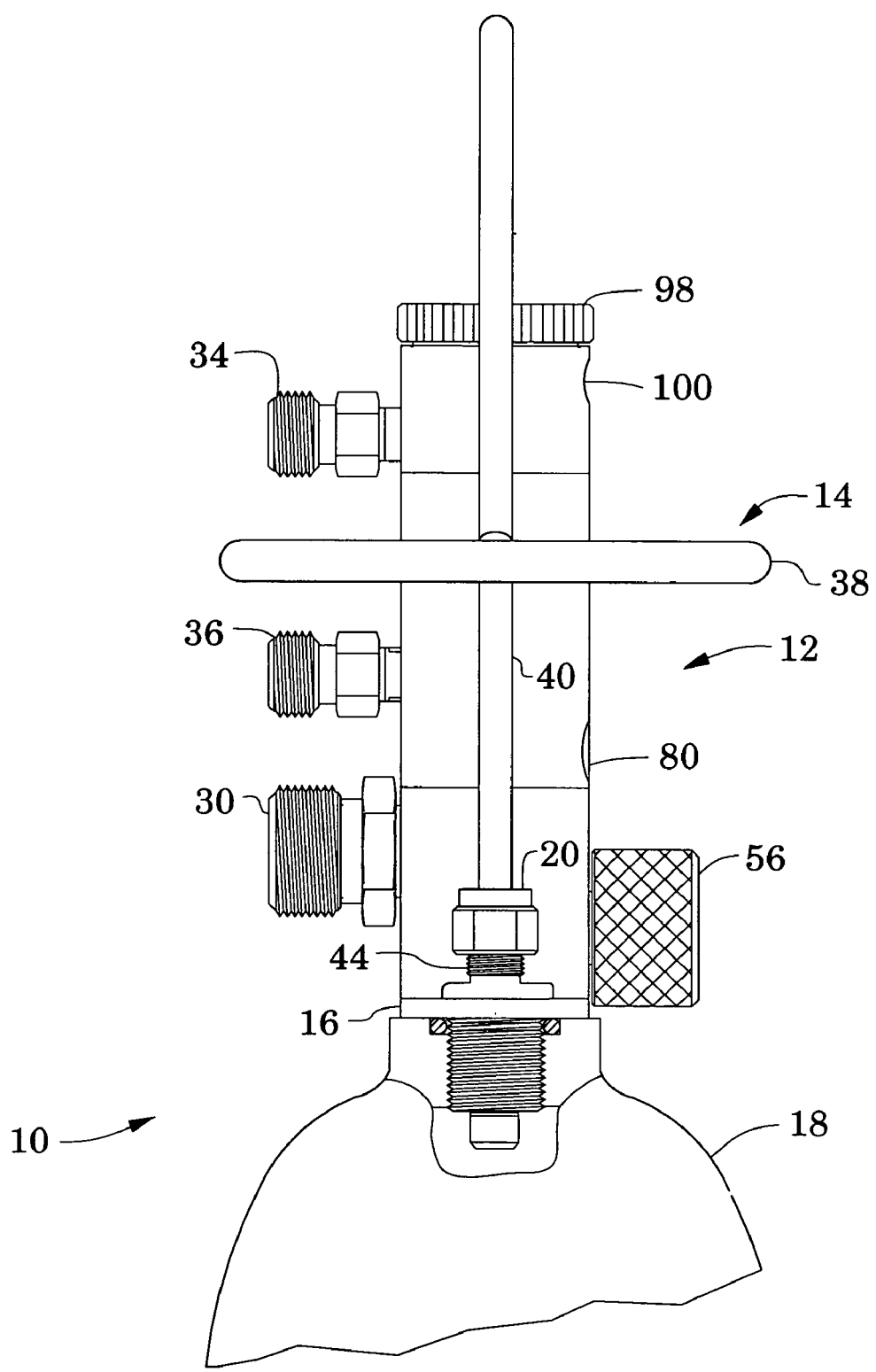
FIG. 2 is a side elevational view of the device of FIG. 1.

Referring now to FIG. 2, a side elevational view of gas delivery device with impact protection 10 of FIG. 1 is shown. Regulator and flow control device 12 is shown attached to tank 18. CGA fittings 34, 36 and 30 are shown attached to regulator 12. In the configuration of FIG. 2, hose barb 96 is replaced with a standard CGA threaded fitting 34. Handle 14, including horizontal circular portion 38 and u-shaped vertical portion 40 are shown in more detail. Aperture 80, wherein pressurized gas readings are viewable, is shown. Aperture 100 provides a viewport wherein numbers attached to or inscribed on knob 98 are displayed so that a flow rate is selectable by the user in accordance with the position of knob 98. Shut-off valve knob 56 is also shown. Nut 20 secures handle 14 to the threaded protrusion 44 formed in flange washer 16 are also shown.

Figure 3:
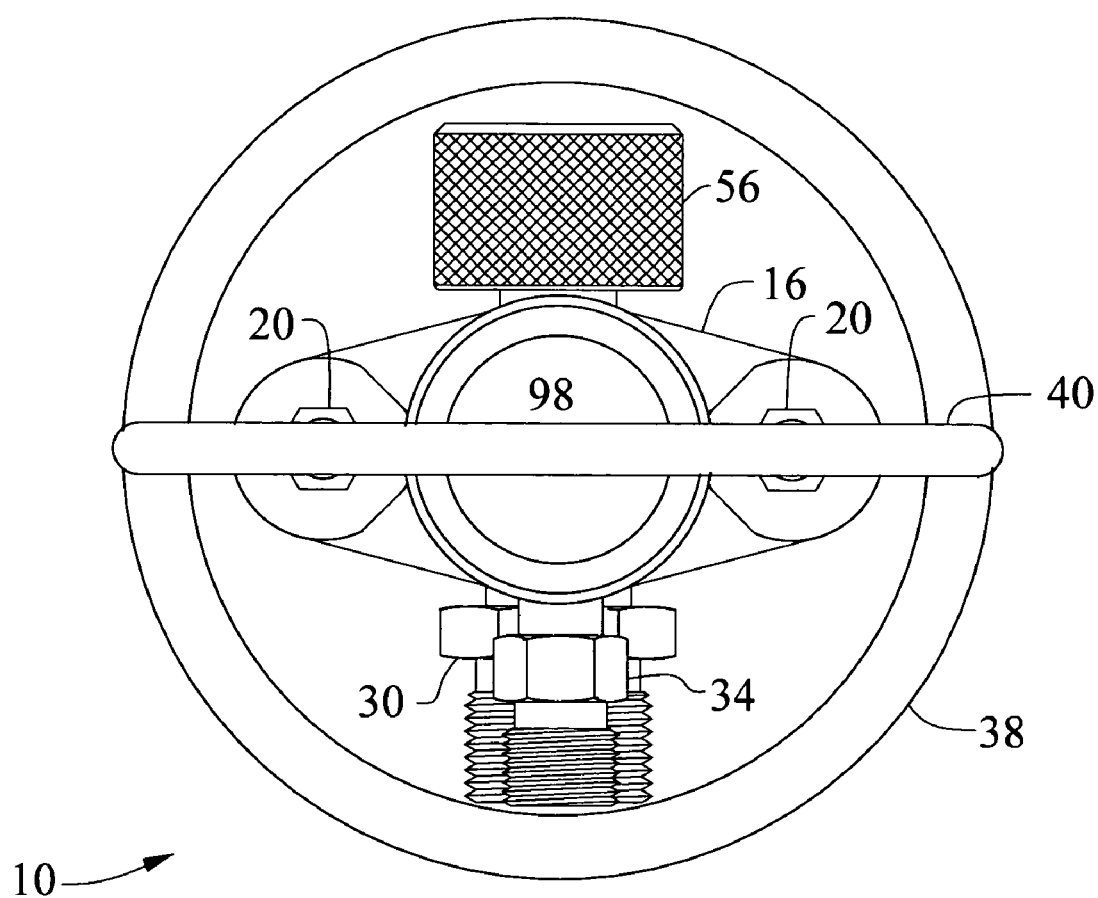
FIG. 3 is a plan view of the device of FIG. 1.

Referring now to FIG. 3, a plan view of the portable gas delivery device with impact protection 10 of FIG. 2 is shown. In this view, shut-off valve knob 56, flange washer 16, nuts 20, flow meter knob 98 and CGA fittings 30 and 34 are visible. Circular handle portion 38 and vertical u-shaped handle portion 40 are also shown.

Figure 4:
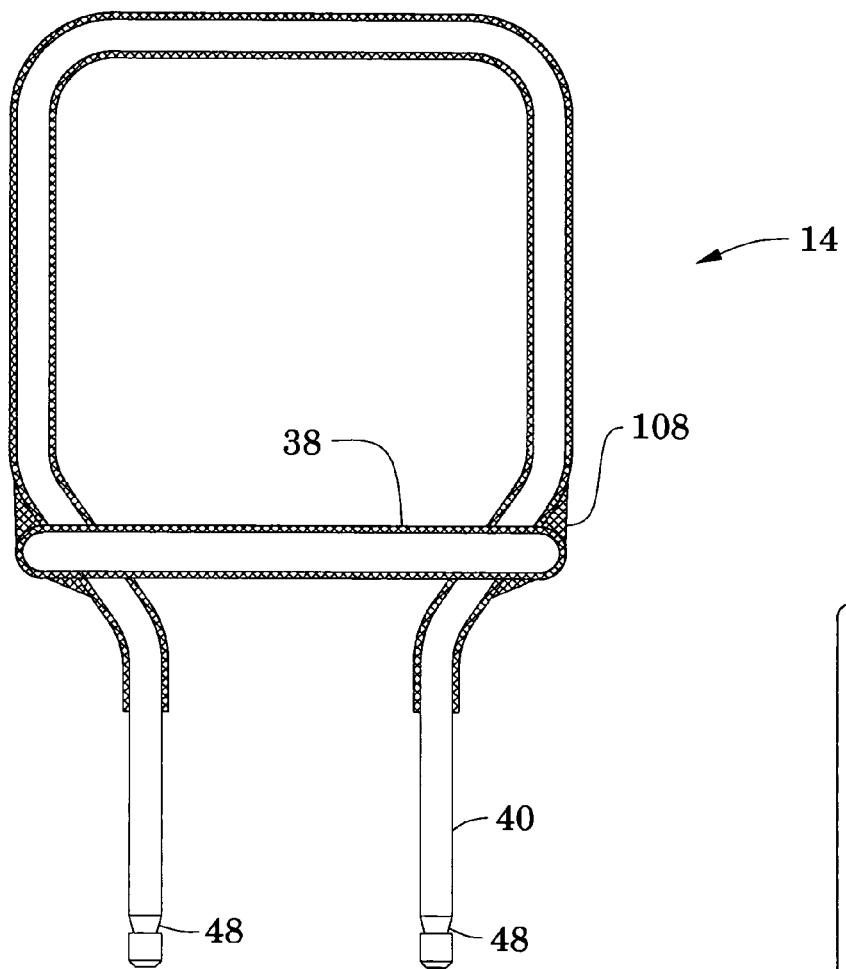
FIG. 4 is a front elevational view of the handle shown in FIGS. 1, 2 and 3.
Figure 5:
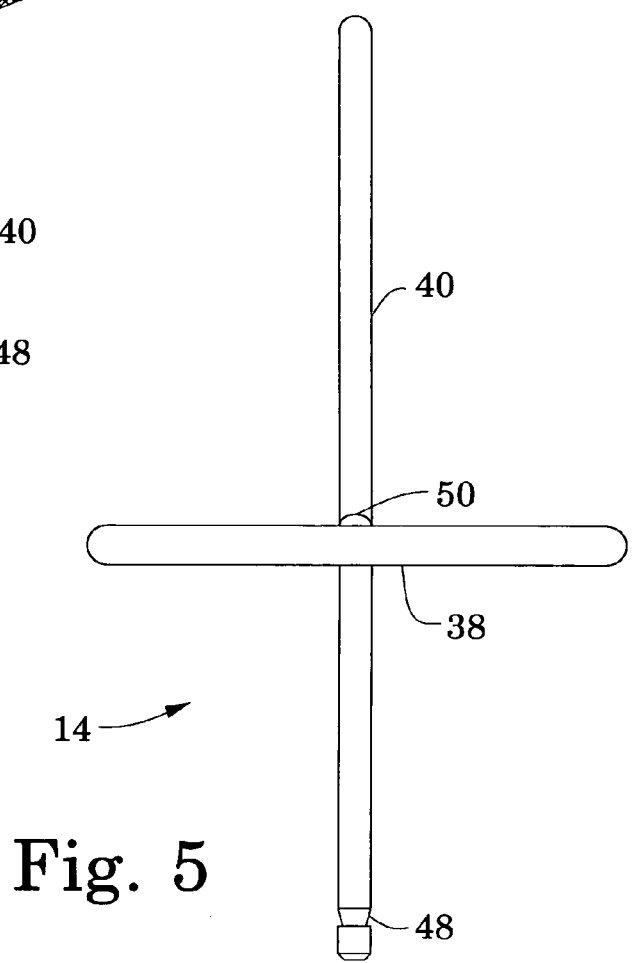
FIG. 5 is a side elevational view of the handle shown in FIGS. 1, 2 and 3.

Referring now to FIGS. 4 and 5, handle assembly 14 is shown in a front elevational and side elevational view, respectively. FIG. 4 depicts an alternate embodiment of handle assembly 14 with a coating 108 applied to handle assembly 14. Circular handle portion 38 and u-shaped handle portion 40 include coating 108 surrounding a substantial portion of handle assembly 14 in FIG. 4. Coating 108 is shown in cross-section and is surrounds handle assembly 14 as shown. Coating 108 aids the user in gripping handle assembly 14 and provides a some resilience when handle assembly 14 impacts foreign objects. Coating 108 is a rubber or plastic based substance applied using a dip or spray process. Also shown are tapered notches 48 that are engaged by nuts 20 of FIG. 1. U-shaped portion 40 and circular portion 38 are attached via a weldment 50. Handle 14 is constructed of preferably a metal such as aluminum or stainless steel for strength and rigidity, yet, modern hi strength reinforced polymers may also be used in the construction thereof. Both handle configurations shown in FIGS. 4 and 5 are contemplated for use with the device 10 of FIG. 1. It is also contemplated that handle assembly 14 may be fabricated in a casting process or molding process to produce a unitary handle and thereby eliminate the fabrication step of attaching two separate components via a weldment.

Although handle portion 38 is shown to be generally circular in shape, it is contemplated that an oval, square, or multi-sided geometric shape (pentagonal, hexagonal, octagonal or dodecahedron for example) could be used instead of a circular shape. Further, it is also contemplated that handle portion 38 need not fully surround device 12 of FIG. 1, but rather, may substantially surround device 12 to provide lateral directional impact protection. However, it is ideal that handle 14 provide impact protection from all lateral angles of attack.

Figure 6:
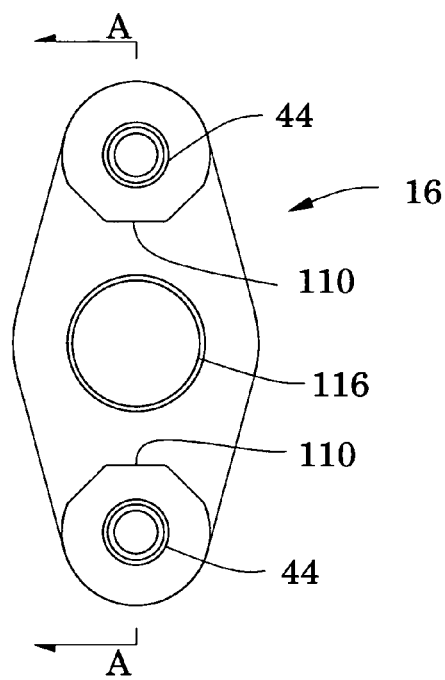
FIG. 6 is a plan view of the flange washer 16 of FIG. 1.
Figure 7:
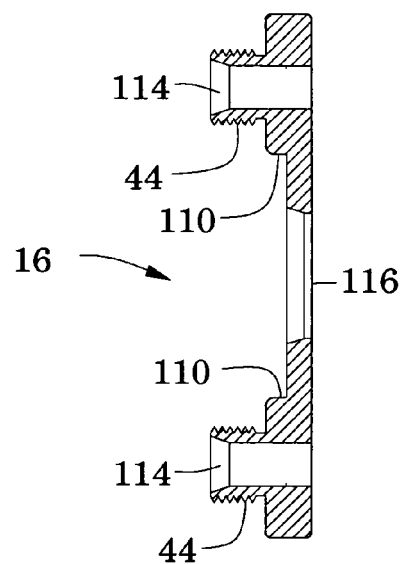
FIG. 7 is a cross-sectional view of the flange washer of FIG. 6 looking in the direction of the arrows labeled A—A.
Figure 8:
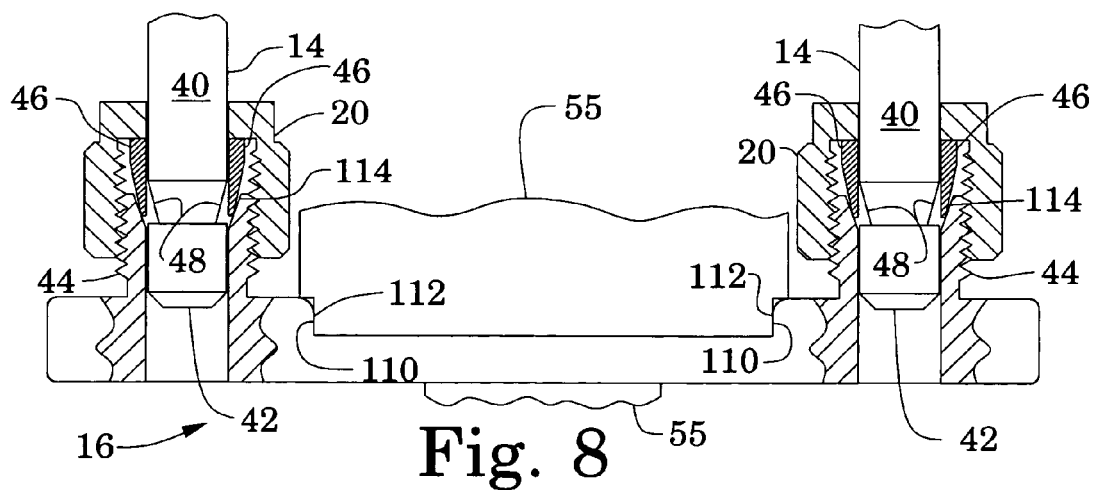
FIG. 8 is a partial cross-sectional view of flange washer 16 depicting the position of handle 14 and regulator 12.

Referring now to FIGS. 6–8, flange washer 16 of FIG. 1 is shown in more detail in a plan view (FIG. 6), a cross-sectional view (FIG. 7) and a partial cross-sectional view (FIG. 8). Flange washer 16 includes two protrusions 44 having external threads that mate with nuts 20. Apertures in protrusions 44 receive the free ends 42 of handle assembly 14. When nuts 20 are rotated onto threaded protrusions 44, compression inserts 46 (made from plastic, nylon or the like) are forced inward by conical surfaces 114 into notches 48 to secure handle 14 in position with respect to flange washer 16. Planar surfaces 110 positively engage corresponding flat surfaces 112 of body 55 of regulator and flow meter device 12. Surfaces 110 and 112 ensure the correct orientation of regulator 12 with respect to flange washer 16 so that fill port fitting 30 (FIG. 1), regulated gas output port 36 (FIG. 1) and hose barb fitting 34 (FIG. 1) are not obscured or interfered with by the angular position of the u-shaped portion 40 of handle assembly 14. Threaded portion 24 (FIG. 1a) of regulator 12 is disposed through aperture 116 in flange washer 16. Flange washer 16 is fabricated from metals such as aluminum, stainless steel or brass. Reinforced polymer materials may also be used to construct flange washer 16.

It is contemplated that the mating planar surfaces 110 and 112 are not limited to planar engaging surfaces as shown, but can take the form of any mechanically engaging mechanism, including but not limited to, a protrusion on one and a notch on the other, angular mating surfaces similar to the design of a wrench that engages a hexagonal nut, or any multitude of known mating mechanical interfaces that will provide positive angular alignment between regulator device 12 and flange washer 16.

Materials used in the construction of device 10, such as brass and aluminum, are well known in the art of compressed gas regulation and flow control devices. Combinations of materials are also contemplated in the construction of device 10 to achieve MRI (magnetic resonance imaging) compatibility including non-magnetic stainless steel and reinforced polymers.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A portable device for dispensing compressed gas comprising:
    a sealed pressure vessel, said pressure vessel including a threaded aperture communicating with the interior of said pressure vessel;
    a flange washer having a gas aperture therethrough and wherein said flange washer is situated over said threaded aperture of said sealed pressure vessel so that said aperture of said flange washer is aligned with said threaded aperture, said flange washer further including a flange protrusion extending outward from said flange washer;

a gas regulator including a body having a threaded protrusion adapted to mate with and engaging said threaded aperture of said sealed pressure vessel, a fluid channel within said body extending from within said body through said threaded protrusion and establishing fluid communication with the interior of said sealed pressure vessel, said gas regulator further including a pressure regulator in fluid communication with said fluid channel, said pressure regulator having an output orifice at which reduced pressure gas is available, said body further including a body protrusion that mechanically engages said flange protrusion, said body protrusion situated near said threaded protrusion; and a handle attached to said flange washer, said handle including a u-shaped portion attached to said flange washer at the free ends of said u-shaped portion, said u-shaped portion extending away from said pressure vessel and substantially surrounding said gas regulator, said handle including a second rod portion attached to said u-shaped rod portion and situated substantially transverse to said first portion, said second portion substantially surrounding said gas regulator.

2. The device of claim 1 wherein said handle is removably attached to said flange washer.

3. The device of claim 2 including a gas flow control having a flow control input orifice and a flow control output orifice, said gas flow control attached to said gas regulator with said flow control input orifice in fluid communication with said output orifice of said pressure regulator, and wherein metered gas flow is delivered to said flow control output orifice; and wherein said gas flow control is disposed between said u-shaped portion of said handle.

4. The device of claim 3 wherein said flange washer includes a mating protrusion extending outward toward said gas regulator and wherein said gas regulator includes a mating portion of said body formed to positively engage said mating protrusion.

5. The device of claim 4 wherein said mating protrusion includes a planar surface that engages a planar portion formed in the body of said gas regulator.

6. The device of claim 5 including a protective coating applied to a substantial portion of said handle and wherein said handle is made of metal.

7. The device of claim 1 wherein said body of said gas regulator includes a shutoff orifice in fluid communication with said fluid channel, said portable device further including a shutoff valve attached to said gas regulator body and disposed in said shutoff orifice, said shutoff valve extending into said fluid channel wherein said shutoff valve is positionable in a first operable position to enable fluid flow through said fluid channel, said shutoff valve being positionable in a second operable position to block all fluid flow from said sealed pressure vessel through said fluid channel.

8. An impact protection device for use with a portable gas delivery system, the portable gas delivery system including a pressure regulator device having a threaded protrusion and attached to a pressurized tank having a threaded aperture, said impact protection device comprising:

a flange washer situated between the tank and the pressure regulator device, said flange washer having a substantially planar configuration and extending perpendicularly beyond the regulator device, said flange washer further including a regulator aperture therein to receive the threaded protrusion of the pressure regulator device therethrough;

a substantially u-shaped rod attached to said flange washer at the free ends of said u-shaped rod, said u-shaped rod extending away from the tank and over the pressure regulator device in a first plane; and protection means for preventing mechanical impact with the pressure regulator device, said protection means situated in a plane substantially perpendicular to said first plane and attached to said u-shaped rod, said protection means substantially surrounding the pressure regulator device.

9. The impact protection device of claim 8 wherein said protection means is a second rod transversely attached to said u-shaped rod and substantially surrounding the pressure regulator device.

10. The impact protection device of claim 9 wherein said u-shaped rod is removably attached to said flange washer.

11. The impact protection device of claim 10 wherein said u-shaped rod and said protection means are substantially covered by a resilient coating.

12. The device of claim 11 including alignment means for rotationally aligning said flange washer with the pressure regulator device, said alignment means having a first portion situated on said flange washer and a second portion situated on the pressure regulator and wherein said first and said second portion engage one another to orient said flange washer with respect to the regulator.

13. The impact protection device of claim 12 wherein said resilient coating is a polymer based material.

14. A portable device for dispensing compressed gas comprising:

a sealed pressure vessel, said pressure vessel including a threaded aperture communicating with the interior of said pressure vessel;

a substantially flat disk having a disk aperture therethrough and wherein said disk is situated adjacent said pressure vessel with said disk aperture aligned with said threaded aperture of said sealed pressure vessel;

a gas regulator including a body having a threaded protrusion adapted to mate with and engaging said threaded aperture of said sealed pressure vessel, a fluid channel within said body extending from within said body through said threaded protrusion and establishing fluid communication with the interior of said sealed pressure vessel, said gas regulator further including a pressure regulator situated within said body in said fluid channel, said pressure regulator having an output orifice at which reduced pressure gas is produced; and a handle attached to said flange washer, said handle including a u-shaped portion having two free ends and attached to said flange washer at said free ends, said u-shaped portion extending away from said pressure vessel and substantially surrounding said gas regulator on three sides thereof, said handle including a second rod portion attached to said u-shaped rod portion and situated substantially transverse to said first portion, said second portion being formed to substantially surround said gas regulator.

15. The device of claim 14 further including:

alignment means for rotationally aligning said gas regulator with said disk, said alignment means having a first portion situated on said disk and a second portion situated on said gas regulator body.

16. The device of claim 15 wherein said handle is removably attached to said disk.

17. The device of claim 16 wherein said handle includes a resilient coating applied to a substantial portion of the exterior surfaces of said handle.

18. The device of claim 17 wherein said body of said gas regulator further includes a shutoff orifice in fluid communication with said fluid channel, said portable device further including a shutoff valve attached to said gas regulator body and disposed in said shutoff orifice, said shutoff valve extending into said fluid channel and wherein said shutoff valve is positionable in a first operable position to enable fluid flow through said fluid channel, said shutoff valve being positionable in a second operable position to block all fluid flow from said sealed pressure vessel through said fluid channel.

* * * * *